US007478849B2

(12) United States Patent
Fortin (10) Patent No.: US 7,478,849 B2
(45) Date of Patent: Jan. 20, 2009

(54) VEHICLE BUMPER ASSEMBLY (75) Inventor: Hugo F. Fortin, Commerce Township, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 88 days.

(21) Appl. No.: 11/679,576

(22) Filed: Feb. 27, 2007

(65) Prior Publication Data

US 2008/0203744 A1  Aug. 28, 2008

(51) Int. Cl.
*B60R 19/02* (2006.01)
(52) U.S. Cl. ..................................... 293/120
(58) Field of Classification Search ............ 296/187.04, 296/187.12; 293/102, 120, 132, 137, 154, 293/155
See application file for complete search history.

(56) References Cited

U.S. PATENT DOCUMENTS

| | | | | |
|---|---|---|---|---|
| 1,726,191 A | * | 8/1929 | Peacock | 293/150 |
| 1,844,216 A | * | 2/1932 | Erickson | 293/150 |
| 2,157,657 A | * | 5/1939 | Eaton | 293/150 |
| 2,329,808 A | * | 9/1943 | Wolfe | 293/127 |
| 2,954,256 A | | 9/1960 | Barenyi | |
| 3,820,834 A | | 6/1974 | Wilfert et al. | |
| 3,823,968 A | | 7/1974 | Barenyi | |
| 3,843,180 A | * | 10/1974 | Alexander | 293/150 |
| 3,907,352 A | * | 9/1975 | Spain et al. | 293/152 |
| D245,597 S | * | 8/1977 | Gee et al. | D12/169 |
| 4,397,490 A | | 8/1983 | Evans et al. | |
| 5,431,464 A | | 7/1995 | Jones et al. | |
| 5,823,587 A | | 10/1998 | Kim | |
| 6,474,708 B1 | | 11/2002 | Gehringhoff et al. | |
| 6,695,368 B1 | | 2/2004 | Weykamp et al. | |
| 2002/0047281 A1 | | 4/2002 | Hartel et al. | |
| 2002/0129981 A1 | | 9/2002 | Satou | |
| 2004/0032133 A1 | | 2/2004 | Bird | |
| 2005/0156443 A1 | | 7/2005 | Suzuki et al. | |

FOREIGN PATENT DOCUMENTS

GB  1320808  6/1973
GB  2122551  1/1984

* cited by examiner

*Primary Examiner*—H Gutman
(74) *Attorney, Agent, or Firm*—Global IP Counselors, LLP (57) ABSTRACT A vehicle bumper assembly includes a bumper reinforcement member, a corner bracket and a biasing member. The bumper reinforcement member has a first lateral end section, a second lateral end section, an outboard facing side extending between the first and second lateral end sections and an inboard facing side with a vehicle mounting structure. The corner bracket is pivotally supported to the first lateral end section of the bumper reinforcement member proximate the inboard facing side. The biasing member extends between the outboard facing side of the bumper reinforcement member and an outboard side of the corner bracket. The biasing member biases the corner bracket outwardly relative to the vehicle mounting structure to a normal rest position for absorption of low speed impact energy.

33 Claims, 8 Drawing Sheets

VEHICLE BUMPER ASSEMBLY

BACKGROUND OF THE INVENTION

1. Field of the Invention

The present invention relates to vehicle bumper assembly. More specifically, the present invention relates to vehicle bumper assembly that includes resilient corner support structure.

2. Background Information

Vehicle bumper assemblies are continually being improved to resist damage during low speed impact events. A typical vehicle bumper assembly usually includes a rigid reinforcement member, an energy absorbing member and a fascia. The rigid reinforcement member is typically rigidly fixed to the vehicle body structure. The energy absorbing member is typically a resilient member that is fixed to an outboard side of the rigid reinforcement member. The fascia typically is a flexible molded member that conceals both the energy absorbing member and the rigid reinforcement member. The fascia also typically extends well beyond the side or lateral side ends of the energy absorbing member and the rigid reinforcement member in order to provide a tasteful appearance to the vehicle bumper assembly. As a result, the fascia is unsupported at the lateral side ends of the vehicle bumper assembly. Hence, when there is a low speed impact event with contact at either of the lateral side ends of the vehicle bumper assembly, the fascia is easily dented or deformed as a result of the impact event. Further any vehicle component located behind the lateral side ends of the vehicle bumper assembly is vulnerable to damage as a result of the impact event.

In view of the above, it will be apparent to those skilled in the art from this disclosure that there exists a need for an improved vehicle bumper assembly that improves resistance to damage resulting from low speed impact events. This invention addresses this need in the art as well as other needs, which will become apparent to those skilled in the art from this disclosure.

SUMMARY OF THE INVENTION

It has been discovered that to improve resistance to damage at lateral side ends of a vehicle bumper assembly, the lateral side ends of the vehicle bumper assembly perform better with reinforcement behind the lateral side ends.

One object of the present invention is to improve the resistance to damage of the lateral side ends of the vehicle bumper assembly during low speed impact events. In accordance with one aspect of the present invention, a vehicle bumper assembly includes a bumper reinforcement member, a corner bracket and a biasing member. The bumper reinforcement member has a first lateral end section, a second lateral end section, an outboard facing side extending between the first and second lateral end sections and an inboard facing side with a vehicle mounting structure. The corner bracket is pivotally supported to the first lateral end section of the bumper reinforcement member proximate the inboard facing side. The biasing member extends between the outboard facing side of the bumper reinforcement member and an outboard side of the corner bracket. The biasing member biases the corner bracket outwardly relative to the vehicle mounting structure to a normal rest position for absorption of low speed impact energy.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
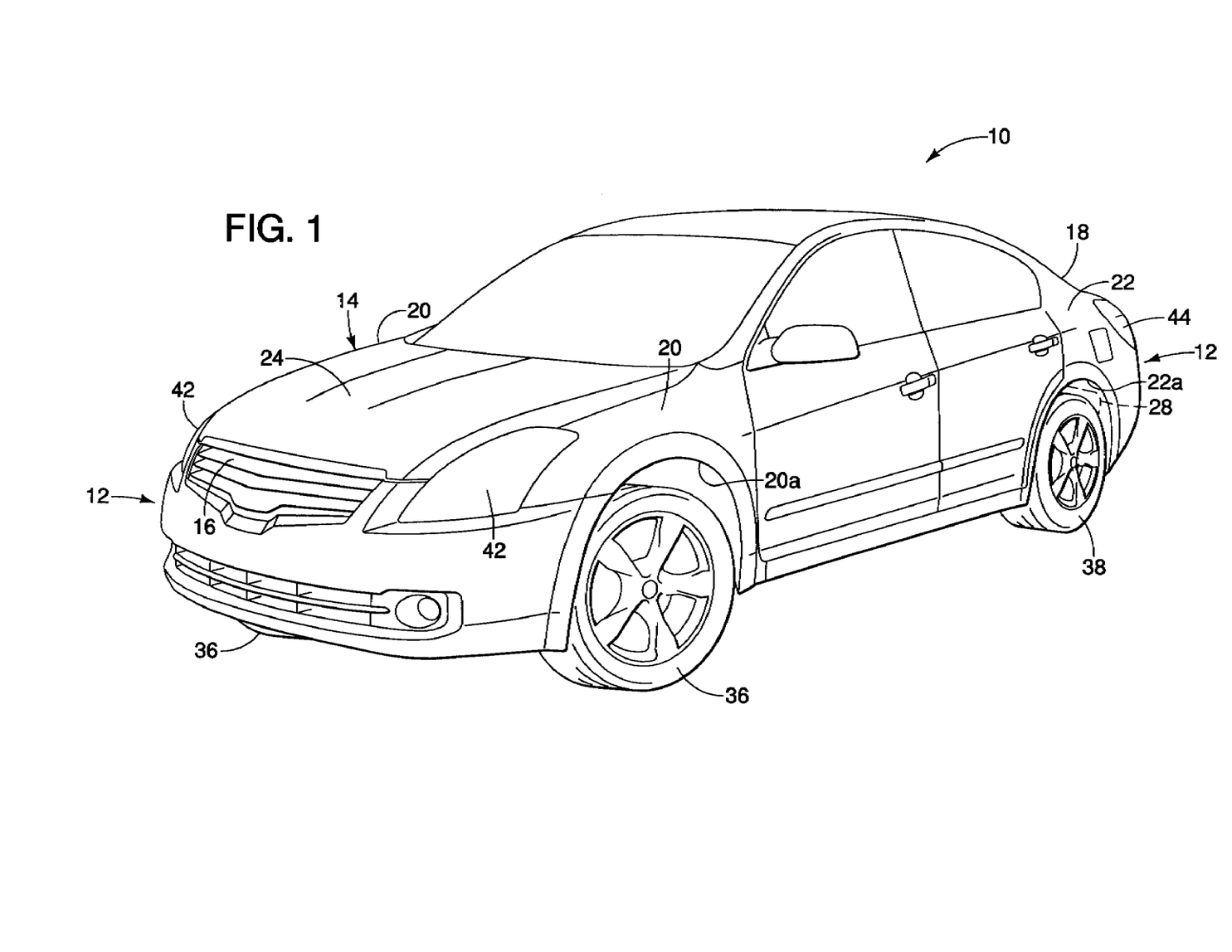
FIG. 1 is a perspective view of a vehicle that includes a bumper assembly in accordance with one embodiment of the present invention.

Referring initially to FIG. 1, a vehicle 10 having a bumper assembly 12 that provides lateral side ends of the bumper assembly 12 with resilience and resistance to damage resulting from low speed impact events is illustrated in accordance with a first embodiment of the present invention.

Figure 2:
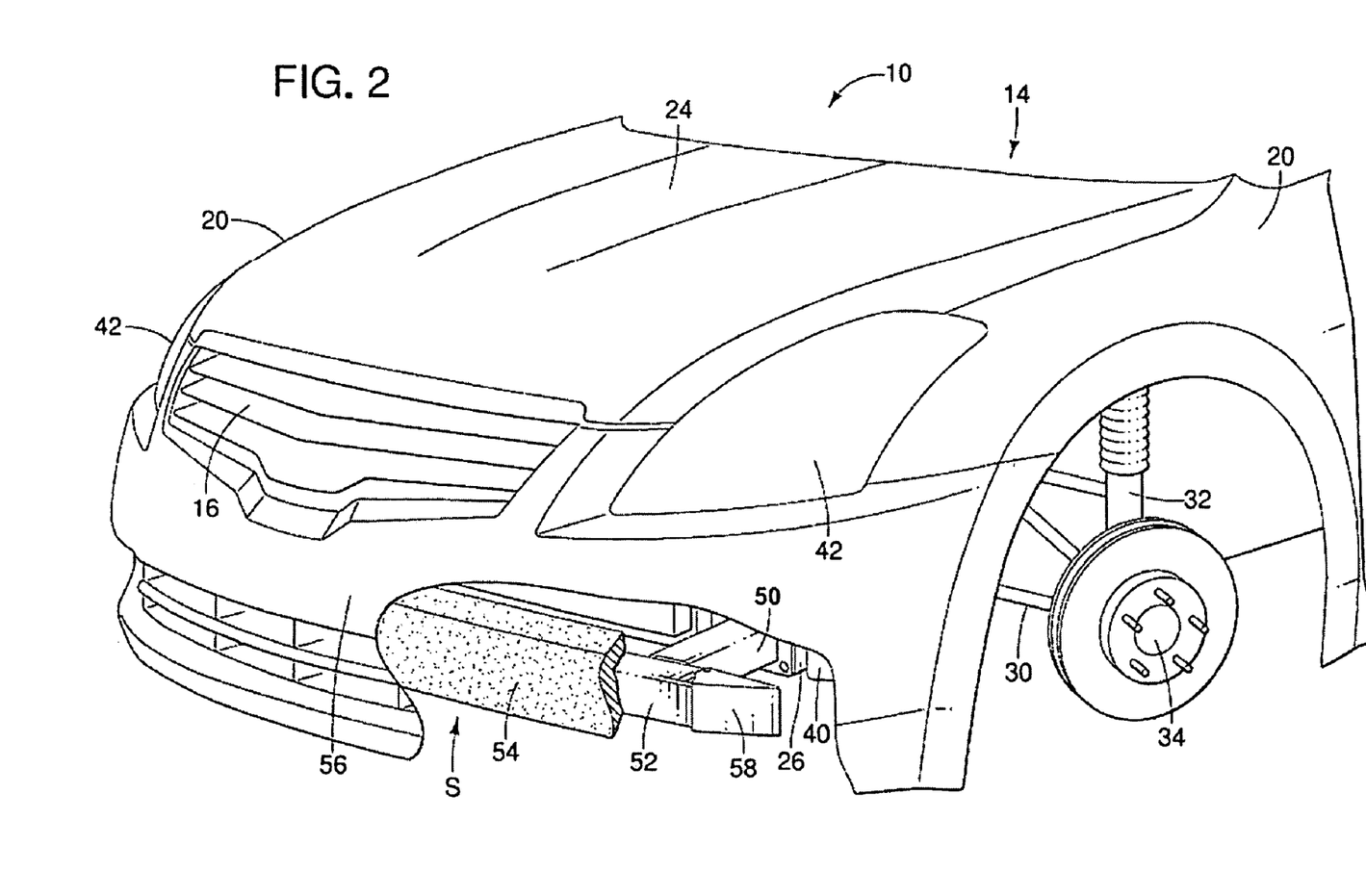
FIG. 2 is a perspective view of a portion of the vehicle depicted in FIG. 1 with a fascia member and an energy absorbing member partially cutaway with the front wheel removed showing details of the bumper assembly in accordance with one embodiment of the present invention.
Figure 6:
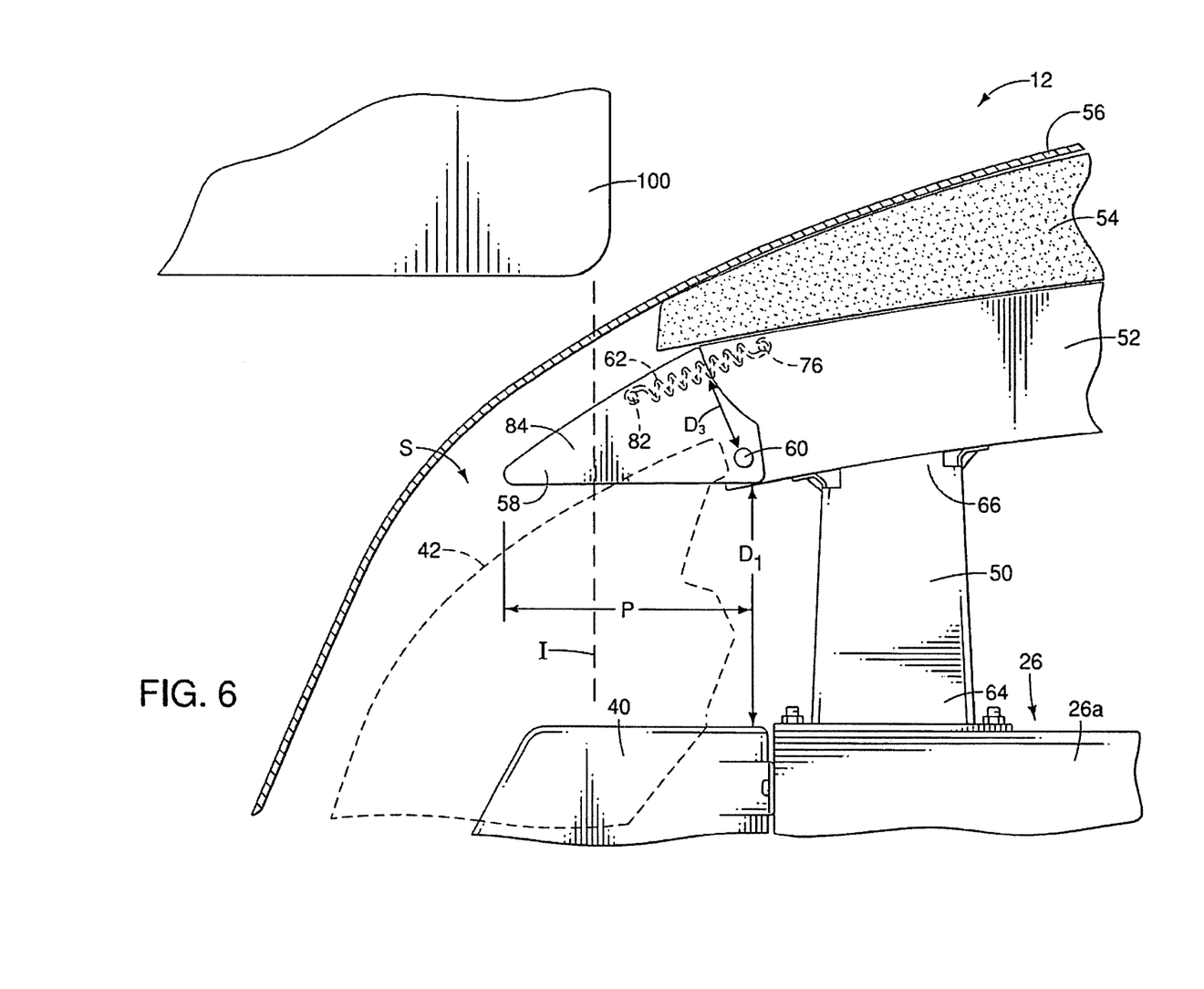
FIG. 6 is a top view of the bumper assembly with the fascia member cutaway in cross-section, showing the corner bracket in an un-impacted orientation (a normal rest position) just prior to a low speed impact event in accordance with one embodiment of the present invention.
Figure 7:
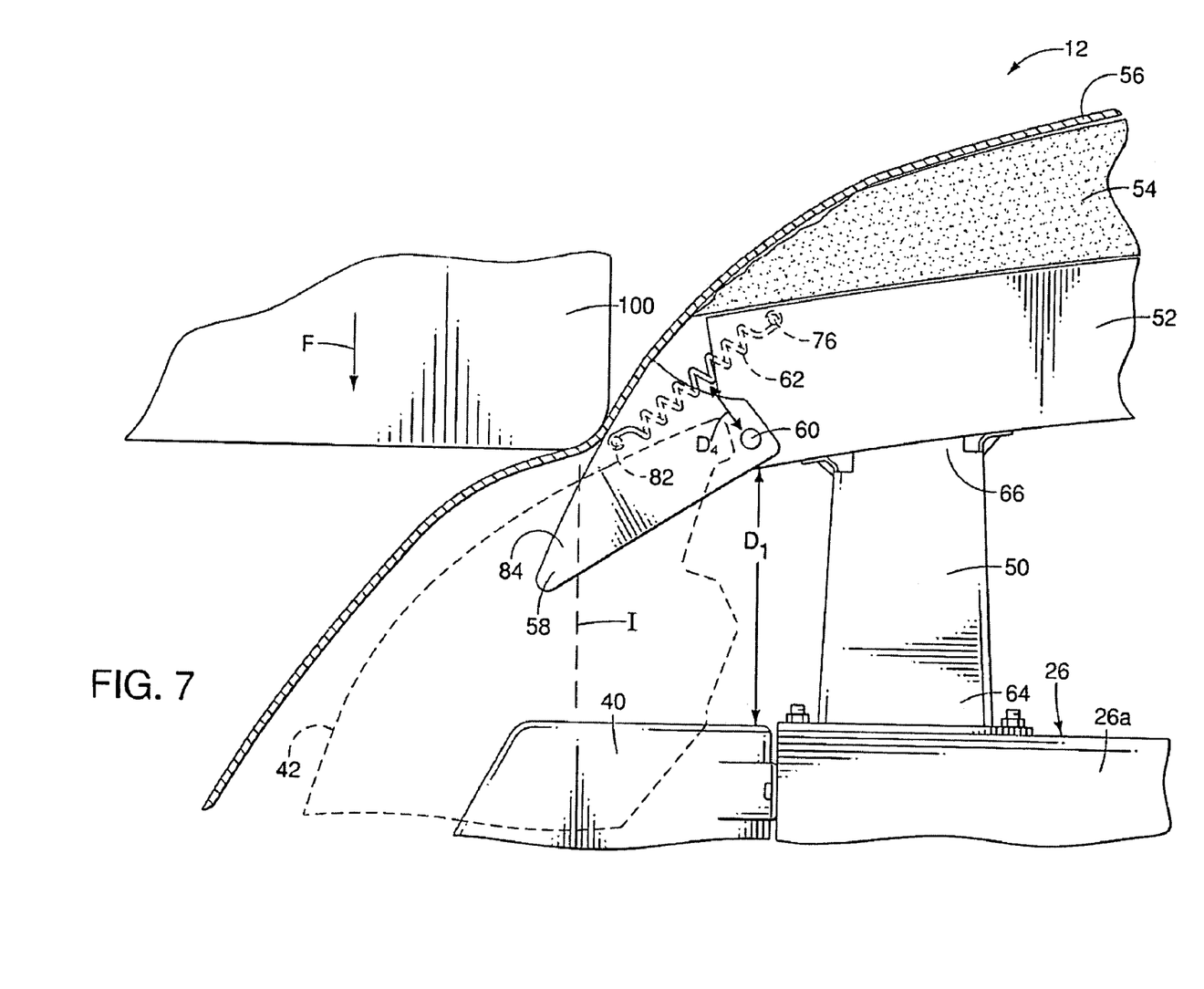
FIG. 7 is a top view of the bumper assembly similar to FIG. 6, showing the corner bracket during a low speed impact event in accordance with one embodiment of the present invention.

As shown in FIGS. 1 and 2, the vehicle 10 includes a vehicle body structure 14. The vehicle body structure 14 includes (among other things) a front end 16, a rear end 18, front fenders 20, rear fenders 22 (only one shown in FIG. 1), an engine hood 24, a forward end structure 26 (FIGS. 2, 3 and 6-9), a rearward end structure 28 (FIGS. 1, 8 and 9) and various vehicle components such as steering/suspension components 30, 32 and 34 (FIG. 2), front and rear wheels 36 and 38 (FIG. 1), and a vehicle component 40 (FIGS. 2, 6 and 7). The forward end structure 26, the rearward end structure 28, the front fenders 20 and the rear fenders 22 are preferably part of a unibody structure that supports an engine (not shown) and the various components of the vehicle 10. Since vehicle unibody structures are well known, a description of unibody structures is omitted for the sake of brevity.

The front end 16 includes the vehicle bumper assembly 12, which is described in greater detail below and headlamp assemblies 42. The headlamp assemblies 42 are symmetrical in shape, one for the drivers' side of the vehicle 10 and the other for the passenger's side of the vehicle 10. The headlamp assemblies 42 are otherwise identical and are conventional. Therefore a detailed description of the headlamp assemblies 42 is omitted for the sake of brevity. Also, since the headlamp assemblies 42 are otherwise identical, description below of one of the headlamp assemblies 42 applies to both.

The headlamp assembly 42 is located in a recess between the engine hood 24 and the front fender 20, as shown in FIGS. 1 and 2. As indicated in FIGS. 6 and 7, the headlamp assembly 42 is located rearward behind the vehicle bumper assembly 12 relative to a longitudinal direction of the vehicle 10. However, the headlamp assembly 42 is located above or vertically higher than the vehicle bumper assembly 12, as indicated in FIGS. 1 and 2.

The rear end 18 also includes a vehicle bumper assembly 12' and tail light assemblies 44 (only one tail light assembly 44 is shown). With respect to the claimed aspects of the present invention, the vehicle bumper assembly 12' is structurally the same as the vehicle bumper assembly 12, except for general engineering considerations related to differences between front and rear structures of the vehicle 10, overall shape and contours and other possible aesthetic considerations. Since the basic structural relationships of the vehicle bumper assembly 12 and the vehicle bumper assembly 12' are the same, description is provided below of only the vehicle bumper assembly 12, for the sake of brevity.

The front fenders 20 are fixed to the forward end structure 26 in a conventional manner (not shown). Each of the front fenders 20 includes a front fender wheel well opening 20a (only one shown), as indicated in FIGS. 1 and 2. As indicated in FIGS. 1 and 2, the front fenders 20 typically cover at least a portion of the front wheels 36 and at least partially conceal the suspension/steering components 30, 32 and 34. The driver's side front fender 20 also at least partially conceals the vehicle component 40.

The rear fenders 22 are fixed to the rearward end structure 28 in a conventional manner (not shown). Each of the rear fenders 22 includes a rear fender wheel well opening 22a (only one shown), as indicated in FIG. 1.

Figure 3:
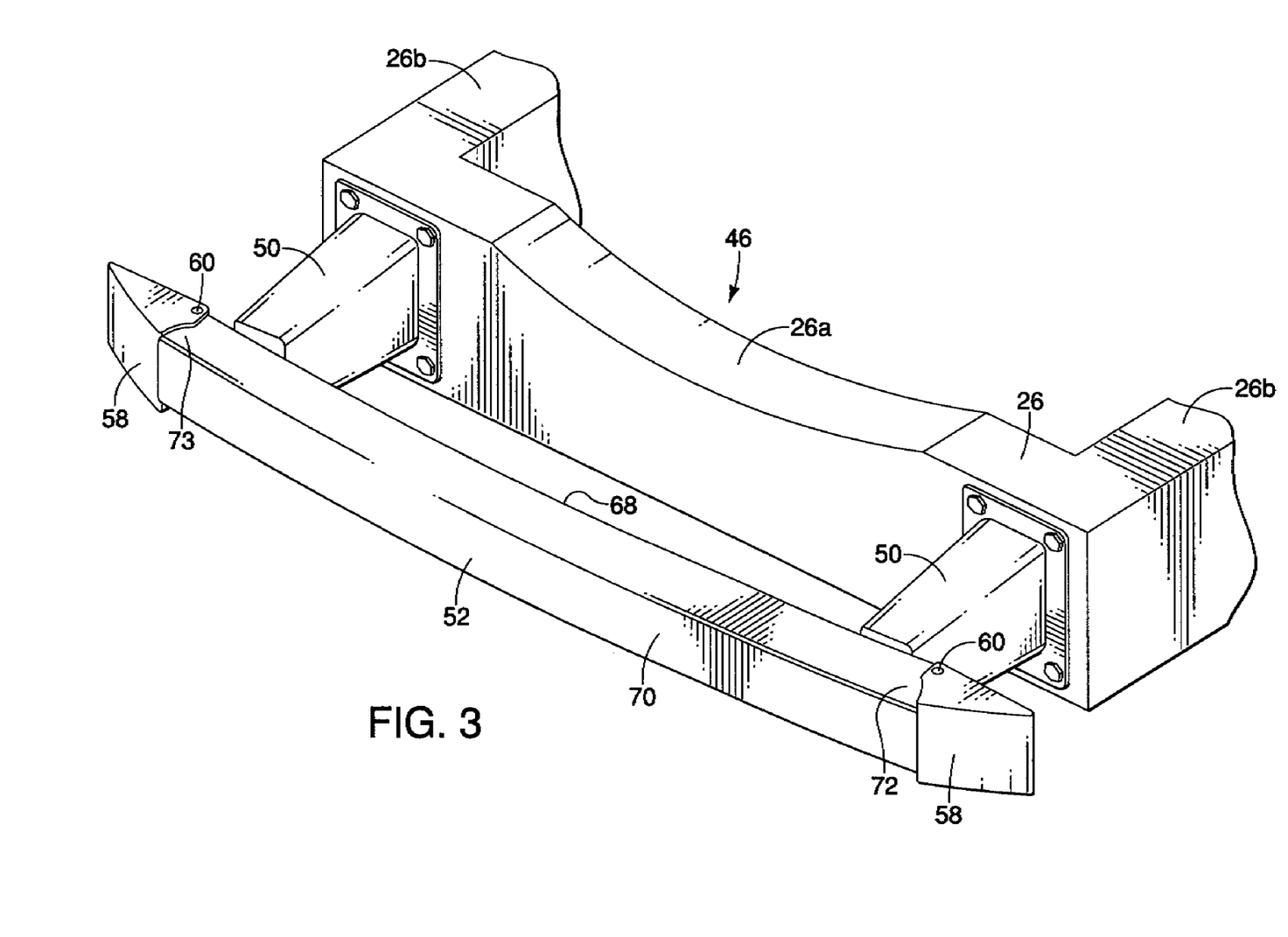
FIG. 3 is a perspective view of the bumper assembly with the fascia member and an energy absorbing member completely removed showing corner brackets in accordance with one embodiment of the present invention.

As shown in FIG. 3, the forward end structure 26 includes at least a forward portion 26a and side portions 26b. The forward portion 26a and the side portions 26b partially encompass an engine compartment 46 that is accessed via the engine hood 24 in a conventional manner.

The rearward end structure 28 is similar to the forward end structure in that the rearward end structure 28 includes various portions that support a trunk area (not shown) and the vehicle bumper assembly 12'. For the sake of brevity, description of the rearward end structure 28 is omitted.

The steering/suspension components 30, 32 and 34 are conventional steering and/or suspension related components that support the front wheels 36.

The vehicle component 40 can be any of a variety of elements, such as safety devices (for example lights, reflectors and/or horn), exhaust elements, an oil cooler and/or windshield washer fluid reservoir. In the depicted embodiment, the vehicle component 40 is a windshield washer fluid reservoir (a vertically extending fluid receiving tank) as indicated in FIGS. 2, 6 and 7. The vehicle component 40 includes a portion located at approximately the height of the vehicle bumper assembly 12, as indicated in FIG. 2. However, as shown in FIGS. 6 and 7, the vehicle component 40 is spaced apart from the vehicle bumper assembly 12, as described in greater detail below with the description of the vehicle bumper assembly 12.

Figure 4:
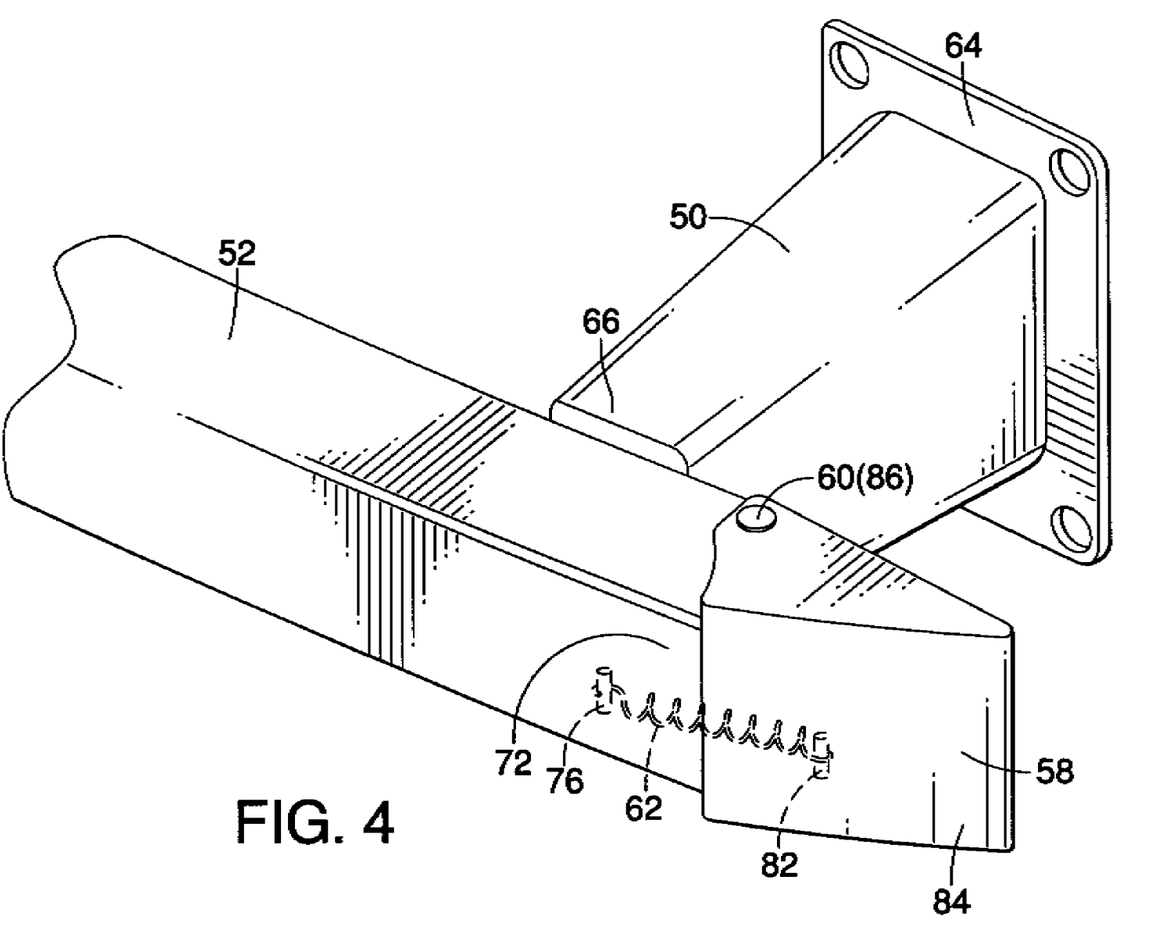
FIG. 4 is a perspective view similar to FIG. 3, on an enlarged scale, showing a lateral side portion of the bumper assembly including one of the corner brackets in accordance with one embodiment of the present invention.
Figure 5:
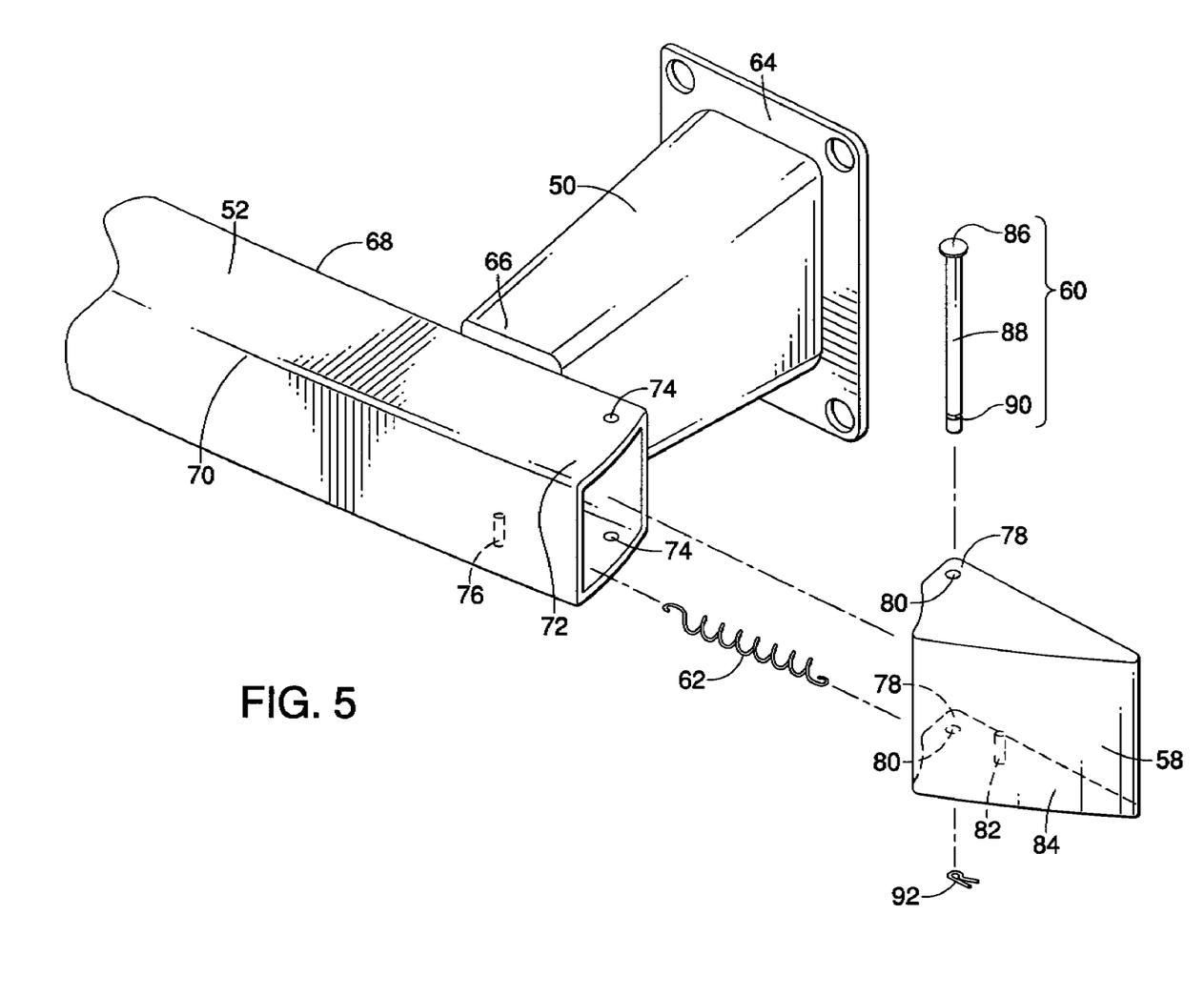
FIG. 5 is an exploded perspective view showing the lateral side portion of the bumper assembly and elements of the corner bracket in accordance with one embodiment of the present invention.

As shown in FIG. 2-5, the vehicle bumper assembly 12 basically includes a pair of bumper stays 50, a rigid bumper reinforcement member 52, an elongated energy absorbing member 54 (FIG. 2), a bumper fascia member 56 (FIG. 2), a pair of corner brackets 58, a pair of pivot rods 60 (FIGS. 3-5) and a pair of biasing members 62 (FIGS. 4 and 5).

There are two bumper stays 50, one on each side of the vehicle 10. The bumper stays 50 are preferably mirror images of one another but are otherwise identical. Each of the bumper stays 50 includes a first end 64 and a second end 66. The first ends 64 are fixed to the forward end structure 26 of the vehicle body structure 14. For example, the first ends 64 can be bolted to the forward end structure 26, as shown. Alternatively, the first ends 64 can be welded or otherwise rigidly fixed to the forward end structure 26. The second ends 66 are welded to an inboard facing side 68 of the bumper reinforcement member 52, as shown in FIG. 3. However, the second ends 66 can alternatively be bolted to the inboard facing side 68 of the bumper reinforcement member 52.

As shown in FIGS. 3, 4 and 5, the rigid bumper reinforcement member 52 includes the inboard facing side 68, an outboard facing side 70, a first lateral end section 72 and a second lateral end section 73. The inboard facing side 68 of the rigid bumper reinforcement member 52 is fixedly coupled to the second ends 66 of the bumper stays 50. The rigid bumper reinforcement member 52 is preferably made of metal, such as steel, but can alternatively be made of a composite material or other suitably rigid material suitable for use in a bumper. The first and second lateral end sections 72 and 73 of the rigid bumper reinforcement member 52 each include apertures 74 and a spring retaining portion 76. The apertures 74 are located on the inboard facing side 68 of the first and second lateral end sections 72 and 73 of the rigid bumper reinforcement member 52.

As shown in FIG. 2, the elongated energy absorbing member 54 is disposed between the bumper reinforcement member 52 and the bumper fascia member 56. The elongated energy absorbing member 54 is fixedly attached to the outboard facing side 70 of the rigid bumper reinforcement member 52 in a conventional manner, such as books and/or fasteners (not shown). Alternatively, the elongated energy absorbing member 54 can be bonded by adhesive to the outboard facing side 70 of the rigid bumper reinforcement member 52. The elongated energy absorbing member 54 is preferably made of a resilient material, such as a polymer foam, rubber or other suitable flexible and resilient material. Preferably, the bumper reinforcement member 52 and the elongated energy absorbing member 54 are concealed by the bumper fascia member 56.

The bumper fascia member 56 is preferably made of a plastic, composite material or polymer material that is flexible and resilient. The bumper fascia member 56 is also preferably contoured and shaped to define a forward end of the vehicle 10 blending in with the design and color of the engine hood 24 and the fender portions 20. The bumper fascia member 56 is configured to cover and conceal the bumper reinforcement member 52, the elongated energy absorbing member 54 and the corner brackets 58. The bumper fascia member 56 extends from side to side along the front end 16 of the vehicle body structure 14. Specifically, rear ends of the bumper fascia member 56 define a forward portion of the front fender wheel well openings 20a (only one shown). In general, the bumper fascia member 56 has an overall cup shape and at least partially encloses a space S shown in FIGS. 2, 6 and 7. The pair of bumper stays 50, the rigid bumper reinforcement member 52, the elongated energy absorbing member 54, the corner brackets 58 and the vehicle component 40 are all disposed within the space S.

As shown in FIG. 3, the pair of corner brackets 58 are pivotally supported to the opposite lateral side sections 72 and 73 of the inboard portion 54 of the bumper reinforcement member 52. Each of the corner brackets 58 is further outwardly biased relative to the vehicle body structure 14 by respective ones of the biasing members 62 for absorption of low speed impact energy, as described further below. The corner brackets 58 are mirror images of one another but are otherwise identical to one another. Description of one of the corner brackets 58 applies to both. Therefore, only one of the corner brackets 58 is described for the sake of brevity.

As shown in FIGS. 4 and 5, the corner bracket 58 includes two spaced apart pivot rod support portions 78. A pair of coaxial apertures 80 (FIG. 5) are formed in the pivot rod support portions 78 with a corresponding one of the pivot rods 60 extending through apertures 80 in the pivot rod supports portions 78. The pivot rod 60 further extends through the apertures 74 in the lateral side sections 72 of the rigid bumper reinforcement member 52. Hence, the corner bracket 58 is pivotally supported to lateral side sections 72 of the inboard facing side 68 of the bumper reinforcement member 52. The corner bracket 58 also includes a spring retaining portion 82 located in an outboard portion 84 of the corner bracket 58.

The pivot rods 60 are elongated metal shafts that are configured to serve as pivot pins for the corner brackets 58. Each pivot rod 60 has a head 86, an elongated cylindrical portion 88 and a keyway or groove 90 that receives a cotter key 92. The pivot rods 60 are configured to extend through corresponding ones of the apertures 74 in the lateral side sections 72 of the rigid bumper reinforcement member 52 and corresponding ones of the apertures 80 in the corner brackets 58. The pivot rods 60 are preferably designed with strength greater than that necessary to withstand the stress associated with low speed impact events.

The biasing members 62 are identical springs or gas filled pistons that either compress gas or expand gas upon elongation of the biasing member 62 such that the biasing member 62 is biased to return to its original length after being elongated. Each of the biasing members 62 is installed to a corresponding one of the corner brackets 58. Therefore a description of only one biasing member 62 is provided for the sake of brevity. The biasing member 62 extends between the outboard portion or outboard facing side 70 of the bumper reinforcement member 52 and the outboard portion 84 of the corner bracket 58. The biasing member 62 is configured to bias the corner bracket 58 outwardly relative to the vehicle body structure 14 for absorption of low speed impact energy. Specifically, the biasing member 62 is installed between the spring retaining portion 76 of the bumper reinforcement member 52 and the spring retaining portion 82 of the corner bracket 58. The biasing member 62 is located outwardly from the pivot rod 60 relative to the vehicle body structure 14.

As indicated in FIGS. 6 and 7, the headlamp assembly 42 is located rearward behind the corner bracket 58 relative to a longitudinal direction of the vehicle 10. Further, the headlamp assembly 42 is located above or vertically higher than the corner bracket 58, as indicated in FIG. 2.

The vehicle component 40 includes a portion located at approximately the height of the corner bracket 58, as indicated in FIG. 2. However, as shown in FIGS. 6 and 7, the vehicle component 40 is spaced apart from the corner bracket 58 by a distance $D_1$ that is equal to or greater than a lateral length P of the corner bracket 48. As also shown in FIGS. 6 and 7, the vehicle component 40 is fixedly attached to the forward end structure 26 (a vehicle front end structure) outside the engine compartment 46 and forward of the front fender wheel well opening 20a such that the corner bracket 58 is located forward from the vehicle component 40 along a horizontal head-on impact path I defined from the vehicle component 40 relative to a longitudinal length of the vehicle 10.

As shown in FIG. 6, an impacting object 100 travels along the head-on impact path I. As shown in FIG. 7, the impacting object 100 contacts the bumper fascia member 56 proximate the corner bracket 58. The corner bracket 58 pivots about the pivot rod 60 and the biasing member 62 is elongated. Once the impacting object 100 has removed or moves away, the corner bracket 58 is biased to return to its normal rest position (FIG. 6) due to the force of the biasing member 62. The force of the biasing member 62 is designed to return the corner bracket 58 and the bumper fascia member 56 back to their original orientations, as shown in FIG. 6. Specifically, the corner bracket 58 moves back to the normal rest position after impact. Since the corner bracket 58 can absorb impact energy in a low speed impact event, the fascia is restored to its original position and the vehicle component 40 and/or the headlamp assembly 42 are protected and damage is minimized.

Figure 8:
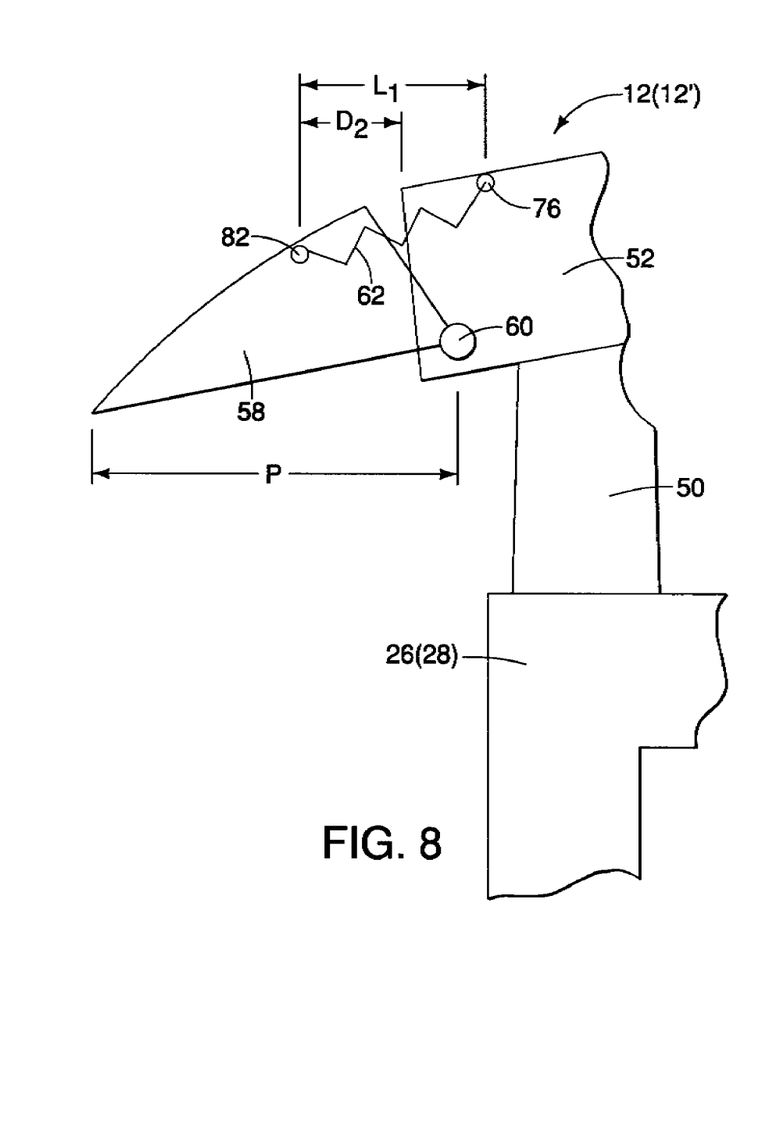
FIG. 8 is a top schematic view of the bumper assembly showing various geometric relationships between the corner bracket and other portions of the bumper assembly with the corner bracket in an non-impacted orientation in accordance with one embodiment of the present invention.
Figure 9:
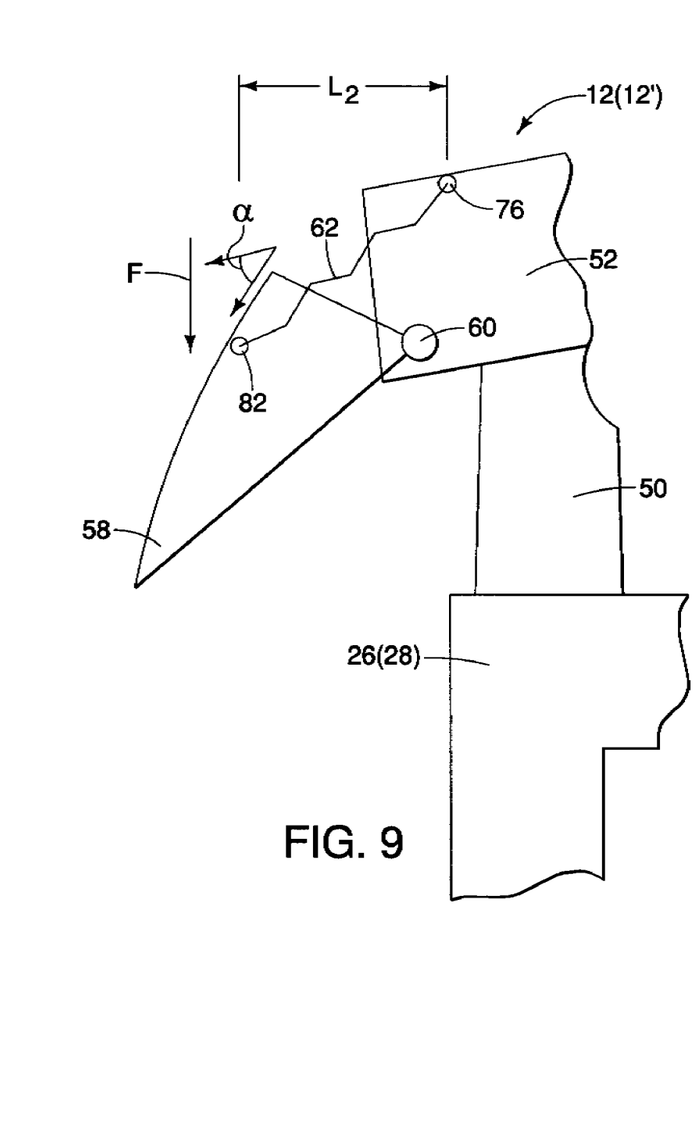
FIG. 9 is a top schematic view of the bumper assembly similar to FIG. 8 showing the corner bracket undergoing angular displacement during a low speed impact event in accordance with one embodiment of the present invention.

As indicated schematically in FIGS. 8 and 9, there are several geometric relationships that influence the relative dimensions of the corner bracket 58, the strength of the biasing member 62 and other aspects of the bumper assembly 12. With specific reference to FIGS. 8 and 9, the following definitions apply:

P equals a lateral length of the corner bracket 58;

F is the anticipated impact force acting on the corner bracket 12;

$D_2$ equals a lateral length measured perpendicularly from the longitudinal length of the vehicle 10 from the front corner of the rigid bumper reinforcement member 52 to the spring retaining portion 82 of the corner bracket 58 indicating an anticipated deflection distance of the corner bracket 58;

$L_1$ (FIG. 8) equals a lateral length measured perpendicularly from the longitudinal length of the vehicle 10 from the spring retaining portion 76 of the rigid bumper reinforcement member 52 to the spring retaining portion 82 of the corner bracket 58 with the corner bracket 58 in a non-impacted orientation;

$L_2$ (FIG. 9) equals a lateral length measured perpendicularly from the longitudinal length of the vehicle 10 from the spring retaining portion 76 of the rigid bumper reinforcement member 52 to the spring retaining portion 82 of the corner bracket 58 with the corner bracket 58 in a fully deflected orientation at the moment of impact; and α is an angle of deflection measured relative to the corner bracket 58 in the normal rest or non-impacted orientation (FIG. 8) and the deflected orientation (FIG. 9).

Several important relationships are considered in the design and application of the vehicle bumper assembly 12 of the present invention. For example, the spring constant of the biasing member 62 depends upon the weight of the vehicle 10, the anticipated impact force F, anticipated deflection distance $D_2$, the length $L_1$, the length $L_2$ and the lateral length P. The lateral length P is a vehicle specific variable and depends upon safety, impact resistance engineering and aesthetic design considerations.

As shown in FIG. 6, the biasing member 62 is spaced apart from the pivot rod 60 by a distance $D_3$ with the corner bracket 58 in the normal at rest position. As shown in FIG. 7, the biasing member 62 is spaced apart from the pivot rod 60 by a distance $D_4$ with the corner bracket 58 in the deflected position. A comparison of FIGS. 6 and 7 shows that with the distance $D_3$ is greater than the distance $D_4$. In other words, as the deflection angle of the corner bracket 58 increases, the distance between the pivot rod 60 and the biasing member 62 decreases.

In other words, the overall configuration and dimensions of the biasing member and the corner bracket 58 and other portions of the vehicle bumper assembly 12 of the present invention are not limited to the relative dimensions depicted in the drawings. For example, the height of the corner bracket 58 (i.e., the distance between the pivot rod support portions 78), the lateral length P and the configuration of the biasing member 62 can differ significantly from vehicle to vehicle. Differences and variation in the overall dimensions and appearance of the vehicle bumper assembly 12 are all within the scope of the present invention.

The vehicle bumper assembly 12' at the rear end 18 of the vehicle 10 has generally the same geometric relationships as the vehicle bumper assembly 12. As shown in FIGS. 8 and 9, the vehicle bumper assembly 12' is configured to provide resilient support to the lateral sides thereof. As with the vehicle bumper assembly 12, the vehicle bumper assembly 12' protects vehicle components such as the tail light assembly 44 and/or other components, such as fuel tank related components during low speed impact events.

The various portion of the vehicle 10 not described herein are conventional components that are well known in the art. Since vehicle components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle bumper assembly comprising:
   a bumper reinforcement member having a first lateral end section, a second lateral end section, an outboard facing side extending between the first and second lateral end sections and an inboard facing side with a vehicle mounting structure;
   a corner bracket pivotally supported to the first lateral end section of the bumper reinforcement member proximate the inboard facing side of the bumper reinforcement member, the corner bracket having a lateral outer edge and a lateral inner edge, the corner bracket being movable between a normal at rest position and a deflected position in which the corner bracket pivots in an inboard direction toward the vehicle mounting structure from the normal at rest position, the corner bracket being restricted against outward movement beyond the normal at rest position by contact between an edge of the first lateral end section of the bumper reinforcement member and the lateral inner edge of the corner bracket; and
   a biasing member extending between the outboard facing side of the bumper reinforcement member and an outboard side of the corner bracket, the biasing member biasing the corner bracket outwardly relative to the vehicle mounting structure to the normal at rest position for absorption of impact energy.

2. The vehicle bumper assembly according to claim 1, further comprising:
   a bumper fascia covering and concealing the outboard facing side of the bumper reinforcement member and the corner bracket.

3. The vehicle bumper assembly according to claim 2, further comprising:
   an elongated energy absorbing member disposed between the bumper reinforcement member and the bumper fascia, and concealed by the bumper fascia.

4. The vehicle bumper assembly according to claim 2, further comprising:
   a vehicle end structure coupled to the vehicle mounting structure; and a vehicle component fixedly attached to the vehicle end structure within a space at least partially enclosed by the bumper fascia.

5. The vehicle bumper assembly according to claim 1, further comprising:
a pivot rod extending through a pivot rod supporting portion of the corner bracket and the first lateral end section of the bumper reinforcement member.

6. The vehicle bumper assembly according to claim 5, wherein
the biasing member is located outwardly from the pivot rod relative to the vehicle mounting structure.

7. The vehicle bumper assembly according to claim 5, wherein
the biasing member is spaced apart from the pivot rod by a first distance with the corner bracket in the normal at rest position and the biasing member is spaced apart from the pivot rod by a second distance with the corner bracket in the deflected position with the first distance being greater than the second distance.

8. The vehicle bumper assembly according to claim 1, wherein
the vehicle bumper assembly is installed at a rear portion of the vehicle body structure and the corner brackets are configured such that in the normal at rest positions the corner brackets are disposed forward from a rearmost section of the rigid bumper reinforcement member.

9. The vehicle bumper assembly according to claim 1, wherein
the vehicle bumper assembly is installed at a front portion of the vehicle body structure and the corner brackets are configured such that in the normal at rest positions the corner brackets are disposed rearward from a forwardmost section of the rigid bumper reinforcement member.

10. The vehicle bumper assembly according to claim 1, wherein
the corner bracket includes an upper pivot rod support portion and a lower pivot rod support portion with a pivot rod extending through apertures in both the upper and the lower pivot rod support portions.

11. The vehicle bumper assembly according to claim 1, wherein
the vehicle mounting structure includes a pair of bumper stays each having a first end fixed to the inboard facing side of the bumper reinforcement member.

12. The vehicle bumper assembly according to claim 1, further comprising:
a vehicle front end structure coupled to the vehicle mounting structure; and
a vehicle component fixedly attached to the vehicle front end structure outside an engine compartment of the vehicle front end structure and forward of a front fender wheel well opening of the vehicle body structure, such that the corner bracket is located forward from the vehicle component along a horizontal head-on impact path defined from the vehicle component relative to a longitudinal length of the vehicle front end structure.

13. The vehicle bumper assembly according to claim 12, wherein
the vehicle component includes a headlamp assembly positioned vertically higher than the corner bracket relative to the vehicle front end structure.

14. The vehicle bumper assembly according to claim 12, wherein
the vehicle component includes a vertically extending fluid receiving tank with a portion located at approximately the height of the corner bracket relative to the vehicle front end structure and spaced apart from the corner bracket by a distance equal to or greater than a lateral length of the corner bracket.

15. The vehicle bumper assembly according to claim 1, further comprising:
a vehicle rear end structure coupled to the vehicle mounting structure, the inboard facing side of the bumper reinforcement member being fixedly coupled to the vehicle rear end structure; and
a bumper fascia covering and concealing the outboard facing side of the bumper reinforcement member and the corner bracket.

16. The vehicle bumper assembly according to claim 1, further comprising:
a second corner bracket pivotally supported to the second lateral end section of the bumper reinforcement member proximate the inboard facing side.

17. A vehicle bumper assembly comprising:
a vehicle body structure;
a rigid bumper reinforcement member having a first lateral end section, a second lateral end section, an outboard facing side extending between the first and second lateral end section and an inboard facing side rigidly and fixedly coupled to one end of the vehicle body structure;
a pair of corner brackets pivotally supported to respective ones of the first and second lateral end sections of the bumper reinforcement member proximate the inboard facing side, the corner brackets being outwardly biased relative to the vehicle body structure for absorption of impact energy, each of the corner brackets having a lateral outer edge and a lateral inner edge, the corner brackets being movable between respective normal at rest positions and deflected positions in which the corner brackets pivot in an inboard direction toward the vehicle body structure from the normal at rest positions, each of the corner brackets being restricted against outward movement beyond the normal at rest positions by contact between respective ones of the first and second lateral end sections of the bumper reinforcement member and respective ones of the lateral inner edges of the corner bracket; and
a fascia member covering and concealing the bumper reinforcement member and the corner brackets.

18. The vehicle bumper assembly according to claim 17, further comprising:
an elongated energy absorbing member disposed between the bumper reinforcement member and the bumper fascia and concealed by the bumper fascia.

19. The vehicle bumper assembly according to claim 17, further comprising:
a pair of pivot rods extending through respective pivot rod supporting portions of the corner brackets and the lateral ends of the bumper reinforcement member proximate the inboard facing side.

20. The vehicle bumper assembly according to claim 16, further comprising
a pair of biasing members extending between the outboard facing side of the bumper reinforcement member and corresponding outboard sides of the corner brackets, the biasing members configured to bias the corner brackets outwardly relative to the vehicle body structure for absorption of low speed impact energy.

21. The vehicle bumper assembly according to claim 19, wherein
each of the corner brackets includes an upper pivot rod support portion and a lower pivot rod support portion with a corresponding one of the pivot rod extending through apertures in the upper and lower pivot rod support portions.

22. The vehicle bumper assembly according to claim 19, wherein
the biasing members are spaced apart from respective ones of the pivot rods by a first distance with the corner brackets in the normal at rest positions and the biasing members are spaced apart from the respective ones of the pivot rods by a second distance with the corner bracket in the deflected position with the first distance being greater than the second distance.

23. The vehicle bumper assembly according to claim 17, wherein
the vehicle bumper assembly is installed at a rear portion of the vehicle body structure and the corner brackets are configured such that in the normal at rest positions the corner brackets are disposed forward from a rearmost section of the rigid bumper reinforcement member.

24. The vehicle bumper assembly according to claim 17, wherein
the vehicle bumper assembly is installed at a front portion of the vehicle body structure and the corner brackets are configured such that in the normal at rest positions the corner brackets are disposed rearward from a forwardmost section of the rigid bumper reinforcement member.

25. The vehicle bumper assembly according to claim 17, further comprising:
a pair of bumper stays each having a first end fixed to the vehicle body structure and a second end fixed to the inboard facing side of the bumper reinforcement member at respective ones of the lateral ends of the bumper reinforcement member.

26. The vehicle bumper assembly according to claim 17, further comprising:
a vehicle component configured to fixedly attach to the vehicle body structure outside an engine compartment of the vehicle body structure and forward of a front fender wheel well opening of the vehicle body structure, such that a corresponding one of the corner brackets is located forward from the vehicle component along a horizontal head-on impact path defined from the vehicle component relative to a longitudinal length of the vehicle body structure.

27. The vehicle bumper assembly according to claim 26, wherein
the vehicle component includes a headlamp assembly positioned vertically higher than the corresponding one of the corner brackets relative to the vehicle body structure.

28. The vehicle bumper assembly according to claim 26, wherein
the vehicle component includes a vertically extending fluid receiving tank with a portion located at approximately the height of a corresponding one of the corner brackets relative to the vehicle body structure and spaced apart from the corresponding one of the corner brackets by a distance equal to or greater than a lateral length of the corresponding one of the corner brackets.

29. The vehicle bumper assembly according to claim 17, further comprising:
a vehicle component fixedly attached to the vehicle body structure within a space at least partially enclosed by the bumper fascia.

30. The vehicle bumper assembly according to claim 17, wherein
the vehicle body structure includes a vehicle rear end structure coupled to the vehicle mounting structure, the inboard facing side of the bumper reinforcement member being fixedly coupled to the vehicle rear end structure.

31. A vehicle bumper assembly comprising:
a bumper reinforcement member having a first lateral end section, a second lateral end section, an outboard facing side extending between the first and second lateral end sections and an inboard facing side with a vehicle mounting structure;
a corner bracket pivotally attached to the first lateral end section of the bumper reinforcement member, the corner bracket having an outboard side, a lateral inner edge and a pivot support portion disposed inwardly from the lateral inner edge, the corner bracket being movable between a normal at rest position and a deflected position in which the corner bracket pivots in an inboard direction toward the vehicle mounting structure from the normal at rest position, the corner bracket being restricted against outward movement beyond the normal at rest position by contact between an outboard edge of the first lateral end section of the bumper reinforcement member and the lateral inner edge of the corner bracket;
a pivot rod extending through the first lateral end section adjacent to the inboard facing side of the bumper reinforcement member and the pivot support portion; and
a biasing member extending between the bumper reinforcement member and the corner bracket biasing the corner bracket toward the normal at rest position for absorption of impact energy, with the pivot rod being disposed inboard relative to the biasing member.

32. The vehicle bumper assembly according to claim 31, wherein
the biasing member is spaced apart from the pivot rod with the corner bracket in the normal at rest position.

33. The vehicle bumper assembly according to claim 31, wherein the biasing member is spaced apart from the pivot rod by a first distance with the corner bracket in the normal at rest position and the biasing member is spaced apart from the pivot rod by a second distance with the corner bracket in the deflected position with the first distance being greater than the second distance.

* * * * *